(12) United States Patent
Panecki et al.

(10) Patent No.: US 9,913,188 B2
(45) Date of Patent: Mar. 6, 2018

(54) METHOD FOR ESTABLISHING A CONNECTION BETWEEN A USER EQUIPMENT AND A BASE STATION OF A RADIO NETWORK

(71) Applicant: Orange, Paris (FR)

(72) Inventors: Szymon Panecki, Warsaw (PL); Dawid Koziol, Głogów (PL)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/320,741

(22) PCT Filed: Jun. 11, 2015

(86) PCT No.: PCT/IB2015/001115
§ 371 (c)(1),
(2) Date: Dec. 20, 2016

(87) PCT Pub. No.: WO2015/198133
PCT Pub. Date: Dec. 30, 2015

(65) Prior Publication Data
US 2017/0135013 A1     May 11, 2017

(30) Foreign Application Priority Data

Jun. 23, 2014 (EP) ..................................... 14305982

(51) Int. Cl.
*H04W 36/18* (2009.01)
*H04W 36/32* (2009.01)
*H04W 36/00* (2009.01)

(52) U.S. Cl.
CPC ....... *H04W 36/18* (2013.01); *H04W 36/0077* (2013.01); *H04W 36/32* (2013.01)

(58) Field of Classification Search
CPC . H04W 36/04; H04W 36/00; H04W 36/0072; H04W 36/18; H04W 36/32
See application file for complete search history.

(56) References Cited

U.S. PATENT DOCUMENTS

| | | | |
|---|---|---|---|
| 2014/0056243 A1* | 2/2014 | Pelletier | H04W 74/04 370/329 |
| 2015/0312957 A1* | 10/2015 | Pelletier | H04W 74/04 370/329 |
| 2016/0338138 A1* | 11/2016 | Pelletier | H04W 74/04 |

FOREIGN PATENT DOCUMENTS

| | | |
|---|---|---|
| EP | 2 645 803 A1 | 10/2013 |
| WO | WO 2011/123744 A1 | 10/2011 |
| WO | WO 2012/034580 A1 | 3/2012 |

OTHER PUBLICATIONS

International Search Report dated Nov. 9, 2015 for International Application No. PCT/IB2015/001115 filed Jun. 11, 2015, 3 pages.

(Continued)

*Primary Examiner* — Diane Mizrahi
(74) *Attorney, Agent, or Firm* — Knobbe, Martens, Olson & Bear, LLP (57) ABSTRACT

Some embodiments relate to a method of establishing a connection between user equipment and a base station of a radio network, wherein connection parameters used to establish a first connection between the user equipment and the base station are stored in a memory of the user equipment and in a memory of the base station prior to the release of the first connection. The method comprises comparing the stored connection parameters with connection parameters to be used to establish a second connection between the user equipment and the base station, generating a connection establishment request comprising the connection parameters to be used for establishing the second connection that differ from the stored connection parameters, and transmitting the connection establishment request to the base station.

10 Claims, 3 Drawing Sheets

(56) References Cited

OTHER PUBLICATIONS

Written Opinion of the International Searching Authority dated Nov. 9, 2015 for International Application No. PCT/IB2015/001115 filed Jun. 11, 2015, 6 pages.
Extended European Search Report dated Jan. 23, 2015 for European Application No. 14305982.2 filed Jun. 23, 2014, 6 pages.

* cited by examiner

METHOD FOR ESTABLISHING A CONNECTION BETWEEN A USER EQUIPMENT AND A BASE STATION OF A RADIO NETWORK

RELATED APPLICATIONS

This application is the U.S. National Phase of Application No. PCT/IB2015/001115 entitled "METHOD FOR ESTABLISHING A CONNECTION BETWEEN A USER EQUIPMENT AND A BASE STATION OF A RADIO NETWORK" filed Jun. 11, 2015, which designated the United States, and which claims the benefit of European Application No. 14305982.2 filed Jun. 23, 2014.

The present invention generally relates to the field of mobility and connection establishment procedures in wireless networks. The invention can be applied for example in the field of Long Term Evolution (LTE) systems as defined by $3^{rd}$ Generation Partnership Project (3GPP).

As defined in 3GPP Technical Specification (TS) 36.331, a user equipment UE, such as a mobile phone, a smartphone, etc. may have two functioning modes called RRC (Radio Resource Control) Idle mode and RRC Connected mode.

After power on, a user equipment UE stays in RRC Idle Mode until it transmits a request to establish an RRC Connection, i.e. when the user equipment UE has data to transmit through the Radio Access Network. While in RRC Idle Mode, all the connections of the user equipment UE are closed, this enables the lowering of the power consumption of the user equipment UE.

When the user equipment UE has data to transmit through the network, it enters the RRC Connected mode by initiating a RRC Connection Establishment procedure as defined in 3GPP TS 36.331. The RRC Connection Establishment Request is transmitted to the access node, for example, an eNodeB (evolved Node B), to which the user equipment UE serving the cell of the network on which the user equipment UE is camping. Such a RRC Connection Establishment Request comprises different parameters related to the user equipment UE such as an identifier of the user equipment UE, and the cause of the establishment.

In answer to the RRC Connection Request, the user equipment UE receives from the eNodeB a RRC Connection Setup message comprising parameters related to the radio connection to be established between the user equipment UE and the eNodeB, identifiers of the PLMN (Public Land Mobile Network) selected, identifiers of the MME (Mobility Management Entity) which manages the mobility of the user equipment UE, and information regarding the NAS (Non-Access Stratum) layer.

Different messages are then exchanged between the eNodeB and the MME in order to provide each other information necessary to the establishment of a Radio Bearer between the user equipment UE and the eNodeB.

When the transmission of the data is over, the eNodeB sends a RRC Connection Release to the user equipment UE and the Radio Bearer is released. The user equipment UE then re-enters RRC Idle Mode.

3GPP based cellular systems are designed for allowing a user equipment UE to change its geographical location and still being able to establish connections to and from the network without any additional action required from user of the user equipment UE. This is achieved thanks to a set of procedures and processes called Mobility Management.

In such a system, when the user equipment UE is in the idle mode, it performs cell measurements which allow the user equipment UE to determine whether the serving cell, i.e. the cell transmitting data to and from the user equipment UE, is the cell providing a potentially best transmission quality. This is done by comparing measured signal level and signal quality of the serving cell with the one measured for available neighbouring cells. Afterwards, the user equipment UE can perform cell reselection, i.e. it can change its serving cell in the case where proper criteria are met. In particular, rules and criteria for cell reselection for user equipment UE are described in 3GPP TS 36.304. These criteria are based on cell measurements, which are performed using the way described in 3GPP TS 36.133.

When in the RRC Connected mode, the user equipment UE performs a handover in order to change the serving cell to which it is currently located due to mobility of the user equipment UE, the user equipment UE can continuously receive the current dedicated data/control channels even in the new serving cell. Rules and criteria for handover are described in 3GPP TS 36.300 and 3GPP TS 36.331.

Depending on the velocity of the user equipment UE, cell reselections or handovers may happen more often; that is to say the faster the user equipment UE is moving the more often cell reselection is performed.

In order to enhance the performance of the network and of the user equipment UE, three mobility states are defined in 3GPP TS 36.304 and TS 36.133: Normal Mobility state, Medium Mobility state and High Mobility state. The mobility state of the user equipment UE is determined by the number of cell reselections performed during a predetermined time. For each mobility state, a set of rules defines how to handle cell reselection. This allows for timely cell reselections and handovers, so that the user equipment UE is always camped or connected to the cell providing the best radio conditions.

A new mobility state, called Low Mobility state is introduced in patent application WO 2011/123744 which applies to user equipments UE with low mobility or no mobility, such as smart metering devices or remote metering devices. In order to prevent excess signalling overhead and to conserve power on the user equipment UE side, new cell selection and handover measurement procedures are defined. Thus, when the user equipment is in low mobility state, the frequency of cell reselection related measurements is lowered in comparison with the frequency of measurement of Normal Mobility state. As a result, the power consumption of the user equipment UE is decreased.

Entering in RRC Connected mode is independent of the mobility state of the user equipment UE. Whatever its mobility state, the user equipment UE must perform RRC Connection Establishment procedure. Such a procedure involves a lot of signaling between the user equipment UE and the eNodeB in order to exchange information and parameters necessary for the establishment of a Radio Bearer between the user equipment UE and the eNodeB. Therefore, there is a need to simplify the RRC Connection Establishment Procedure.

It is an objective of the present invention to overcome disadvantages and/or make improvements in the prior art.

In that respect, the present invention relates to a method for establishing a connection between a user equipment and a base station of a radio network, wherein connection parameters used to establish a first connection between the user equipment and the base station being stored in a memory of the user equipment and in a memory of the base station prior to the releasing of the first connection, the method comprises the following steps of:

comparing the stored connection parameters with connection parameters to be used to establish a second connection between the user equipment and the base station, generating a connection establishment request comprising the connection parameters to be used for establishing the second connection that differ from the stored connection parameters, transmitting the connection establishment request to the base station.

According to the state of the art, i.e. the RRC Connection Establishment procedure as defined in 3GPP TS 36.331, the connection parameters associated used to establish a connection between a user equipment and a base station are deleted when the connection is released. In the prior art, each time the user equipment establishes a connection with a base station, it has to perform a complete RRC Connection Establishment even if some parameters to be used to establish the connection are the same as those used to establish the previous connection with the base station.

By proposing to store connection parameters prior to releasing the connection and to check prior the establishment of a new connection between the user equipment and the base station if some of those parameters may be used in establishing the new connection, the method of the invention enables to optimize the RRC Connection Establishment Procedure by reducing the signaling overhead and the utilized radio resources. Furthermore, the method of the invention allows a reduction of power consumption on the user equipment side.

In the method of the invention, during each Connection Establishment Procedure, which is not a first Connection Establishment Procedure, connection parameters that have not changed since the first connection are not transmitted in the Connection Establishment Request but restored from the memory of the base station.

Such a simplified behavior, i.e. transmitting less information during the Connection Establishment Procedure, enables this procedure to be performed faster and consume less energy.

According to a feature of the method for establishing a connection between a user equipment and a base station of the invention, the generated connection establishment request further comprises a parameter representative of a mobility state of the user equipment.

When a user equipment is in Low Mobility state, the user equipment is served by a single base station for a great period of time or even all the time if the user equipment is a fixed device like a control equipment. In such a case, many of the connection parameters to be used to establish a connection between the user equipment and the base station, such as parameters related to the propagation conditions of the radio signal between the user equipment and the base station, are the same for every new connection. Thus, a simplified procedure such as the method of the invention is particularly well adapted to Low Mobility user equipment.

According to a feature of the method for establishing a connection between a user equipment and a base station of the invention, the method further comprises the steps of:

detecting an expiration of a timer triggered in the base station by the transmission of the connection establishment request transmitted to the base station in order to establish the first connection, deleting the stored connection parameters from the memory of the base station.

In order to avoid a situation in which information that is not up to date is stored in the memory of the base station, a timer is triggered each time a connection is established between the user equipment and the base station. When the timer expires, the base station deletes the stored connection parameters from its memory. The next connection establishment between the user equipment and the base station will be based on the legacy connection establishment procedure, in which the base station provides a full set of connection parameters. Therefore this solution is particularly adapted for Low Mobility user equipments for which the connection parameters change very rarely.

According to a feature of the method for establishing a connection between a user equipment and a base station of the invention, the method further comprises the steps of:

detecting the triggering of a cell reselection procedure, deleting the stored connection parameters from the memory of the user equipment after In order to avoid a situation in which information that is not up to date is stored in the memory of the user equipment, when the user equipment proceeds to a cell reselection, the connection parameters are deleted from the memory of the user equipment. Since the user equipment will be served by another base station, the connection parameters change and a complete RRC Connection Establishment Procedure should be executed.

According to a feature of the method for establishing a connection between a user equipment and a base station of the invention, the method further comprises the steps of:

detecting the triggering of a handover procedure, deleting the stored connection parameters from the memory of the user equipment and the base station.

In order to avoid a situation in which information that is not up to date is stored in the memories of the user equipment and the base station, when the user equipment executes a handover, the connection parameters are deleted from the memories of the user equipment and the base station. Since the user equipment will be served by another base station, the connection parameters change and a complete RRC Connection Establishment Procedure should be executed.

Another object of the invention is a method of communication between a base station and a user equipment of a radio network, wherein connection parameters used to establish a first connection between the user equipment and the base station being stored in a memory of the user equipment and in a memory of the base station prior to the releasing of the first connection, the method comprises the following steps of:

upon reception of a connection establishment request for establishing a second connection between the user equipment and the base station, comparing the stored connection parameters with connection parameters to be used to establish a second connection comprised in the connection establishment request, restoring the connection parameters missing from the connection establishment request from the connection parameters stored in the memory of the base station, transmitting a connection establishment setup message to the user equipment.

The invention also concerns a user equipment connected to a base station of a radio network, wherein connection parameters used to establish a first connection between the user equipment and the base station are stored in a memory of the user equipment and in a memory of the base station prior to the releasing of the first connection, the user equipment comprising a comparator capable of comparing the stored connection parameters with connection parameters to be used to establish a second connection between the user equipment and the base station, a circuit capable of generating a connection establishment request comprising the connection parameters to be used for establishing the second connection that differ from the stored connection parameters, a transmitter for transmitting the connection establishment request to the base station.

Another object of the invention is base station communicating with a user equipment of a radio network, wherein connection parameters used to establish a first connection between the user equipment and the base station are stored in a memory of the user equipment and in a memory of the base station prior to the releasing of the first connection, the base station comprising:

a comparator for comparing the stored connection parameters with connection parameters to be used to establish a second connection comprised in the connection establishment request comprised in a received connection establishment request for establishing a second connection between the user equipment and the base station, a circuit for restoring the connection parameters missing from the connection establishment request from the connection parameters stored in the memory of the base station, a transmitter for transmitting a connection establishment setup message to the user equipment.

Finally, one object of the invention concerns computer programs, in particular computer programs on or in an information medium or memory, suitable for implementing the methods object of the invention. These programs can use any programming language, and be in the form of source code, binary code, or of code intermediate between source code and object code such as in a partially compiled form, or in any other desirable form for implementing the communication methods according to the invention.

The information medium may be any entity or device capable of storing the programs. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The programs according to the invention may in particular be downloaded from a network of Internet type.

The present system and method are explained in further detail, and by way of example, with reference to the accompanying drawings wherein.

For a user equipment UE, such as mobile phones, smartphones, tablets, phablets, etc, that are moving faster than in the state of Normal Mobility new mobility states were introduced by 3GPP in order to improve the radio network performance. These new mobility states are called Medium-Mobility and High Mobility states. Mechanisms corresponding to these two mobility states influence the speed of the user equipment UE decision to change its serving cell. The same modification as defined in Medium Mobility and High Mobility states would not make sense for user equipments UE which are not moving at all or are moving within one cell and thus are not performing cell reselections.

By defining a Low Mobility state in a different way, the power consumption of a user equipment UE can be substantially reduced and thus the battery lifetime is extended.

To this end, the mechanism developed for Low Mobility for user equipments UE comprises the following steps of:

detecting an absence of cell reselection after expiration of a first predetermined timer, setting the user equipment UE to a Low Mobility state where the frequency of cell measurements, called a Low Mobility frequency, is reduced in comparison with a frequency of cell measurements of a default state of said user equipment, called Normal Mobility state, launching said cell measurements at said Low Mobility frequency, evaluating cell reselection criteria at said Low Mobility frequency.

Thus, the Low Mobility state is detected by a user equipment UE using similar rules as it happens in the case of Medium Mobility and High Mobility states, in other words if a user equipment UE does not perform any cell reselection during a first predetermined timer it should enter Low Mobility state, that is to say that the user equipment UE is set to a Low Mobility state.

As defined in 3GPP TS 36.331, a user equipment UE has two functioning modes called RRC (Radio Resource Control) Idle mode and RRC Connected mode.

Figure 1:
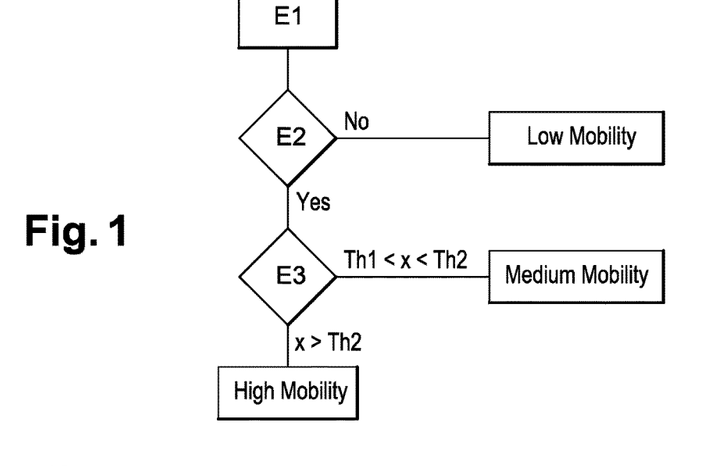
FIG. 1 represents the steps of the method for determining the mobility state of th user equipment according to the invention.

As represented on FIG. 1, the user equipment UE is switched on during a step E1 and enters Normal Mobility state. As long as the user equipment does not have any data to transmit, it remains in RRC Idle Mode.

During a step E2, the number of cell reselection procedures executed by the user equipment UE during a given time slot is measured. If no cell reselection procedure occurs during the given time slot, the user equipment UE enters Low Mobility state. While in this mobility state, the user equipment UE performs cell reselection and handover measurements less frequently than in any other mobility state, this enables power saving and reduces the number messages exchanged between the user equipment and a base station covering the serving cell. The base station may be for example an eNodeB.

During a step E3, the number of cell reselection procedures executed by the user equipment UE during the given time slot is compared to a first threshold Th1. If the number of cell reselection procedures executed by the user equipment UE is greater than the first threshold Th1, then this number is compared to a second threshold Th2. If the number of cell reselection procedures executed by the user equipment UE is lower than the second threshold Th2, then the user equipment enters Medium Mobility state.

If the number of cell reselection procedures executed by the user equipment UE is greater than the second threshold Th2, then the user equipment enters High Mobility state.

When the user equipment UE has data to transmit through the network, it enters in RRC Connected Mode by establishing a connection with the network through the base station covering the serving cell of the user equipment UE in order to provide a service to the user of the user equipment UE.

Figure 2:
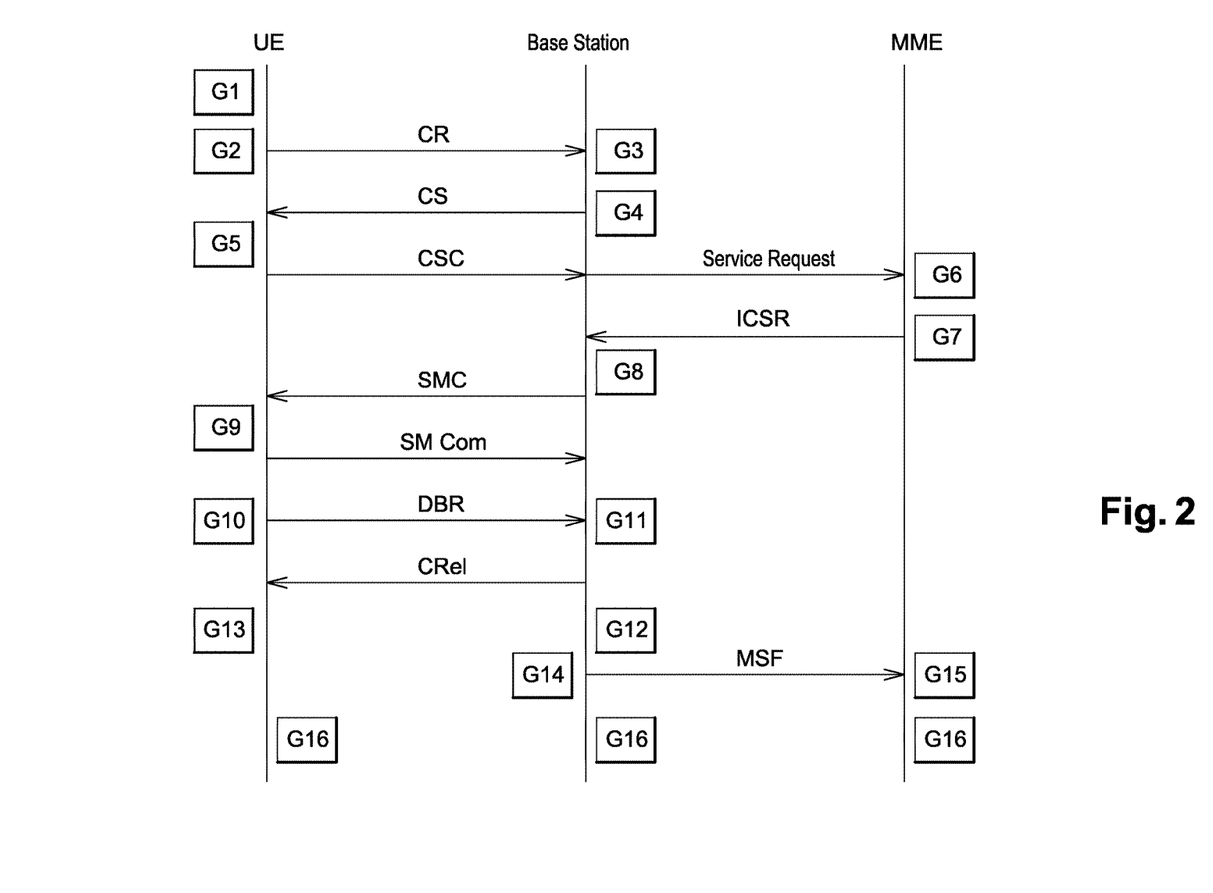
FIG. 2 represents the steps of the method for establishing a connection between a user equipment and a base station of a radio network according to the invention.

A method for establishing a connection between the user equipment UE and the base station covering the cell serving the user equipment UE according to the invention is described in regard of FIG. 2.

When the user equipment UE is in Low Mobility state, there is a high probability that the user equipment UE is served by the same base station for a long period of time, such as a few hours. The consequence of this is that many of the connection parameters used to establish a connection between the user equipment UE and the base station remain the same.

The method for establishing a connection between the user equipment UE and the base station covering the cell serving the user equipment UE according to the invention takes advantage of this situation.

In a first step G1, the user equipment UE, having data to transmit through the network, initiates a connection establishment procedure by emitting a connection request CR to the base station covering the cell serving the user equipment UE. Such a connection request CR is defined in the 3GPP TS 36.331 and comprises different connection parameters such as identifiers of the user equipment UE and the cause of the establishment of the connection.

The connection request CR according to the invention comprises an additional field, called Mobility State, comprising a parameter representing the mobility state of the user equipment UE. Thus, when the user equipment UE is in Low Mobility state, the parameter comprised in the Mobility State field of the connection request CR is set to Low Mobility.

When the parameter stored in the Mobility State field of the connection request CR is set to Low Mobility, then the user equipment UE stores the connection parameters to be used to establish the connection with the base station in a memory of the user equipment UE during a step G2. The connection parameters to be stored in the memory of the user equipment UE are negotiated during the connection establishment procedure.

Upon reception of the connection request CR, the base station detects the presence of the Mobility State field in the connection request CR. When the base station determines that the parameter stored in the Mobility State field of the connection request CR is set to Low Mobility, then the base station stores the connection parameters to be used to establish the connection with the user equipment UE in a memory of the base station during a step G3. The connection parameters to be stored in the memory of the base station are negotiated during the connection establishment procedure.

During a step G4, the base station sends a Connection Setup message CS containing configuration information for the user equipment UE such as information regarding uplink power control, Channel Quality Indicator (CQI), etc. Such a Connection Setup message is defined in 3GPP TS 36.331. Those connection parameters may be stored in the memories of the user equipment UE and of the base station.

In order to complete the connection establishment procedure, the user equipment UE transmits a Connection Setup Complete message CSC to a base station during a step G5. The Connection Setup Complete message contains an Initial UE message (Service Request), which is relayed by the base station to the Mobility Management Entity MME. The Connection Setup Complete message CSC and the Initial UE message are defined in the 3GPP TS 36.331.

The Connection Setup Complete message CSC comprises a Non-Access Stratum (NAS) message intended for the Mobility Management Entity MME. Such a NAS message comprises an additional field, called Mobility State, comprising a parameter representing the mobility state of the user equipment UE. Thus, when the user equipment UE is in Low Mobility state, the parameter comprised in the Mobility State field of the NAS message is set to Low Mobility.

When the Mobility Management Entity MME determines that the parameter stored in the Mobility State field of the NAS message is set to Low Mobility, then the Mobility Management Entity MME stores the connection parameters to be used to establish the connection the user equipment UE and the base station in a memory of the Mobility Management Entity MME during a step G6. The connection parameters to be stored in the memory of the Mobility Management Entity MME are negotiated during the connection establishment procedure between the user equipment UE, the base station and the Mobility Management Entity MME.

In a step G7, the Mobility Management Entity MME transmits an Initial Context Setup Request ICSR to the base station. The Initial Context Setup Request ICSR contains information such as the total aggregate data rate assigned to the user equipment UE, radio access bearer context information, etc. Such an Initial Context Setup Request ICSR is defined in the 3GPP TS 36.331. Those connection parameters may be stored in the memories of the user equipment UE, of the base station and of the Mobility Management Entity MME.

During a step G8, the base station transmits a Security Mode Command message SMC to the user equipment UE specifying which cyphering and integrity algorithms may be used during the connection. Such a Security Mode Command message SMC is defined in 3GPP TS 36.331.

In a step G9, the user equipment UE applies the settings specified in the Security Mode Command message SMC and transmits a Security Mode Complete message SMCom to the base station acknowledging the completion of the connection establishment procedure. Then, during a step G10, a dedicated radio bearer DRB is established between the user equipment UE and the base station in order to transmit data between these two entities.

When the user equipment UE has no more data to transmit through the network, the connection established with the base station is released, that is to say all the radio bearers established and all the radio resources used for the transmission of the data are released. Such a procedure called Connection Release Procedure is defined in 3GPP TS 36.331.

Thus, the base station sends a Connection Release message CRel to the user equipment UE during a step G11. Contrary to the classical connection release procedure, the connection parameters stored in the memory of the base station are not deleted although the connection is released.

As the base station sends the Connection Release message CRel to the user equipment UE, the base station triggers a timer T1 during a step G12.

Upon reception of the Connection Release message CRel by the user equipment UE, the connection between the base station and the user equipment UE is released. In a step G13, the reception of the Connection Release message CRel by the user equipment UE triggers a timer T2. As for the base station, the connection parameters stored in the memory of the user equipment UE are not deleted although the connection is released.

In a step G14, the base station sends a message MSG to the Mobility Management Entity MME informing it of the releasing of the connection between the base station and the user equipment UE. In a step G15, the reception of the message MSG by the Mobility Management Entity MME triggers a timer T3. As for the base station, the connection parameters stored in the memory of the Mobility Management Entity MME are not deleted although the connection is released.

In order to have a more efficient storing of the connection parameters in the different equipments, i.e. the user equipment UE, the base station and the Mobility Management Entity MME, the connection parameters may be split up between these three equipments. For example, the parameters related to lower layer protocols and to security configuration may be stored in the memory of the user equipment UE. The parameters related to the capabilities of the user equipment UE, the Quality of Service QoS required, may be stored in the memory of the base station. The parameters related to the radio access bearers established in order to establish the connection between the user equipment UE and the base station and the radio access bearers established to transit the data may be stored in the memory of the Mobility Management Entity MME.

In a first embodiment of the method of the invention, when the timers T1, T2 and T3 expire, the connection parameters stored in the memories of the user equipment UE, the base station and the Mobility Management Entity MME are deleted.

In a second embodiment of the method of the invention, if, prior to the expiration of the timers T1, T2 and T3, the user equipment UE triggers a handover procedure, then the user equipment UE, the base station and the Mobility Management Entity MME deletes the connection parameters stored in their respective memories because they are no longer useful.

In a third embodiment of the method of the invention, if, prior to the expiration of the timers T1, T2 and T3, the user equipment UE triggers a cell reselection procedure, then the user equipment UE deletes the connection parameters stored in its memory, because they are no longer useful.

Before the expiration of the timers T1, T2, and T3, if the user equipment UE has data to transmit through the network, the user equipment UE needs to establish a second connection with the base station. Since the connection parameters used to establish the first connection between the user equipment UE and the base station are stored in the memories of the user equipment UE, of the base station and of the Mobility Management Entity MME an since the user equipment UE is still served by the same base station, the inventors of the present invention propose to reuse these stored connection parameters in order to establish this second connection, simplifying the connection establishment procedure.

Figure 3:
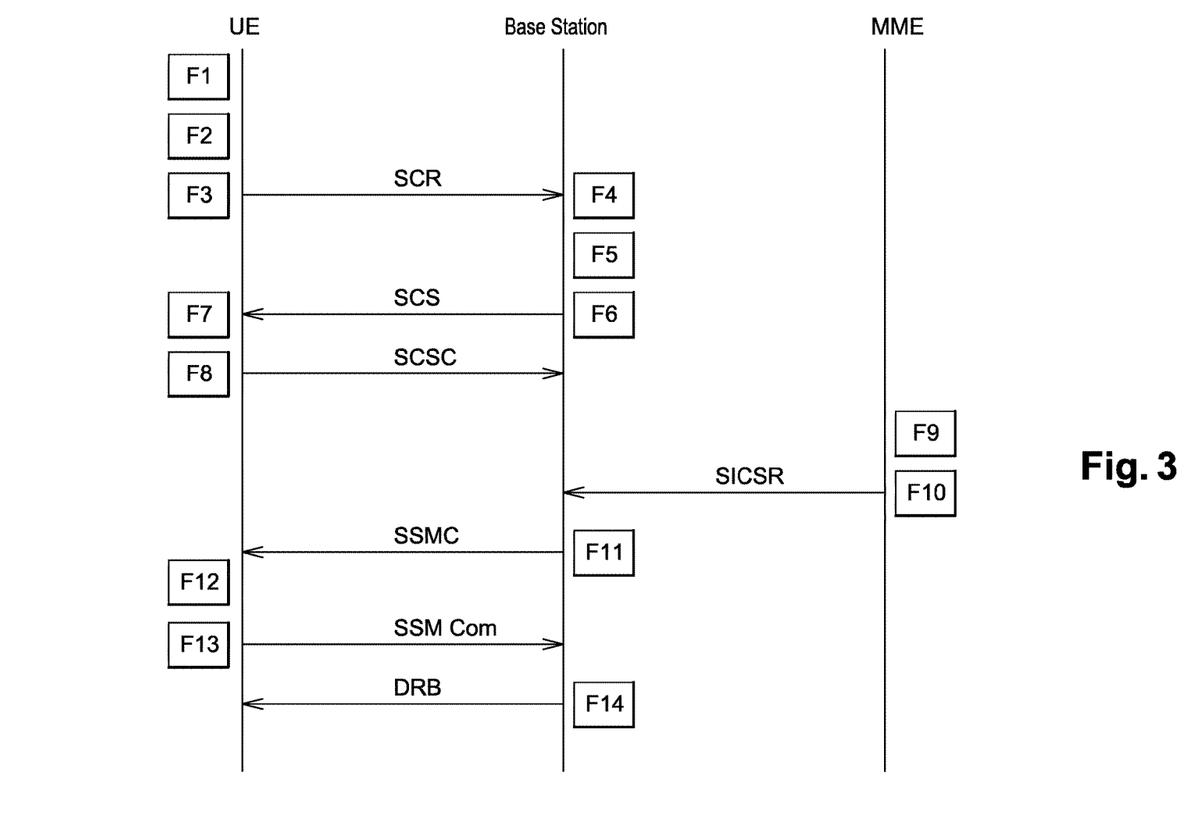
FIG. 3 represents the steps of the method for establishing a simplified connection between a user equipment and a base station of a radio network according to the invention.

As represented on FIG. 3, in a first step F1, the user equipment UE, having data to transmit through the network, initiates a simplified connection establishment procedure.

During a step F2, the user equipment UE compares the connection parameters to be used to establish the second connection with the connection parameters stored in its memory. For a given connection parameter, if the value to be used is the same as the value stored in the memory of the user equipment UE, then this connection parameter is not included in the simplified connection request SCR to be sent to the base station.

Thus, the simplified connection request SCR according to the invention is partially filled.

In a step F3, the simplified connection request is sent to the base station.

Upon reception of the simplified connection request SCR, the base station determines which connection parameters are missing and restores them from its memory during a step F4.

In a step F5, the base station compares the connection parameters to be used to establish the second connection with the connection parameters stored in its memory and generates a Simplified Connection Setup message SCS.

During a step F6, the base station sends the Simplified Connection Setup message SCS to the user equipment UE.

Upon reception of the Simplified Connection Setup message SCS, the user equipment UE determines which connection parameters are missing and restores them from its memory during a step F7.

In order to complete the simplified connection establishment procedure, the user equipment UE transmits a Simplified Connection Setup Complete message SCSC to a base station during a step F8. The Simplified Connection Setup Complete message contains Initial UE message, which is relayed to Mobility Management Entity MME.

In a step F9, the Mobility Management Entity MME compares the connection parameters to be used to establish the second connection with the connection parameters stored in its memory and generates a Simplified Initial Context Setup Request SICSR which is sent to the base station during a step F10.

During a step F11, the base station transmits a Simplified Security Mode Command message SSMC to the user equipment UE.

In a step F12, after restoring the connection parameters missing from the Simplified Security Mode Command message SSMC from its memory, the user equipment UE applies the settings specified and transmits a Simplified Security Mode Complete message SSMCom to the base station acknowledging the completion of the simplified connection establishment procedure. Then, during a step F14, a dedicated radio bearer DRB is established between the user equipment UE and the base station in order to transmit data between these two entities.

Figure 4:
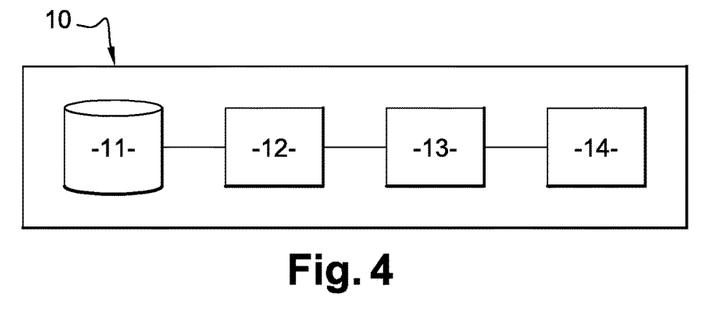
FIG. 4 represents a user equipment according to the invention.

FIG. 4 represents a user equipment 10 connected to a base station 20 some of the connection parameters used to establish a first connection between the user equipment 10 and the base station 20 are stored in a memory 11 of the user equipment 10.

The user equipment 10 comprises a comparator 12 capable of comparing the stored connection parameters with connection parameters to be used to establish a second connection between the user equipment 10 and the base station 20. The comparator 12 is connected to the memory 11.

The user equipment 10 comprises a circuit 13 capable of generating a connection establishment request comprising the connection parameters to be used for establishing the second connection that differs from the stored connection parameters. The circuit 13 is connected to the comparator 12 and to a transceiver 14.

The transceiver 14 transmits the connection establishment request to the base station.

Figure 5:
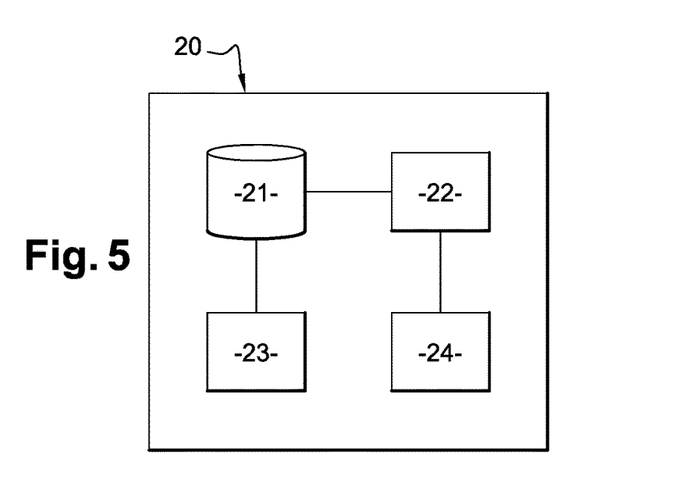
FIG. 5 represents a base station according to the invention.

FIG. 5 represents a base station 20 communicating with the user equipment 10. Some of the connection parameters used to establish a first connection between the user equipment 10 and the base station 20 are stored in a memory 21 of the base station prior to the releasing of the first connection.

The base station 20 comprises a comparator 22 for comparing the stored connection parameters with connection parameters to be used to establish a second connection with the user equipment 10 comprised in the connection establishment request comprised received for establishing a second connection between the user equipment 10 and the base station 20. The comparator 22 is connected to the memory 21.

The base station 20 comprises a circuit 23 for restoring the connection parameters missing from the connection establishment request from the connection parameters stored in the memory 21 of the base station. The circuit 23 is connected to the memory 21 of the base station 20.

The base station 20 comprises a transmitter 24 for transmitting a connection establishment setup message to the user equipment 10. The transmitter 24 is connected to the comparator 22.

The invention claimed is:

1. A method of establishing a connection between user equipment and a base station in a radio network, wherein the method comprises:
   storing, in a memory of the user equipment and in a memory of the base station, connection parameters used to establish a first connection between the user equipment and the base station;
   comparing the stored connection parameters with connection parameters to be used to establish a second connection between the user equipment and the base station;
   generating a connection establishment request comprising the connection parameters to be used for establishing the second connection that differ from the stored connection parameters; and
   transmitting the connection establishment request to the base station.

2. The method of establishing a connection between user equipment and a base station of claim 1, wherein the generated connection establishment request further comprises a parameter representative of a mobility state of the user equipment.

3. The method of establishing a connection between user equipment and a base station of claim 1, further comprising:
   detecting an expiration of a timer triggered by the transmission of the connection establishment request transmitted to the base station in order to establish the first connection; and
   deleting the stored connection parameters from the memory of the user equipment.

4. The method of establishing a connection between user equipment and a base station of claim 1, further comprising:
   detecting the triggering of a cell reselection procedure; and
   deleting the stored connection parameters from the memory of the user equipment.

5. The method for establishing a connection between user equipment and a base station of claim 1, further comprising:
   detecting the triggering of a handover procedure; and
   deleting the stored connection parameters from the memory of the user equipment and of the base station.

6. A method of communicating between a base station and user equipment in a radio network, wherein the method comprises:
   storing, in a memory of the user equipment and in a memory of the base station, connection parameters used to establish a first connection between the user equipment and the base station;
   upon reception of a connection establishment request for establishing a second connection between the user equipment and the base station, comparing the stored connection parameters with connection parameters to be used to establish a second connection comprised in the connection establishment request;
   restoring the connection parameters missing from the connection establishment request from the connection parameters stored in the memory of the base station; and
   transmitting a connection establishment setup message to the user equipment.

7. User equipment configured to be connected to a base station in a radio network, the user equipment comprising:
   a memory configured to store connection parameters used to establish a first connection between the user equipment and the base station;
   a comparator configured to compare the stored connection parameters with connection parameters to be used to establish a second connection between the user equipment and the base station;
   a circuit configured to generate a connection establishment request comprising the connection parameters to be used for establishing the second connection that differ from the stored connection parameters; and
   a transmitter configured to transmit the connection establishment request to the base station.

8. A base station configured to communicate with user equipment in a radio network, the base station comprising:
   a memory configured to store connection parameters used to establish a first connection between the user equipment and the base station;
   a comparator configured to compare the stored connection parameters with connection parameters to be used to establish a second connection included in a received connection establishment request for establishing a second connection between the user equipment and the base station;
   a circuit configured to restore the connection parameters missing from the connection establishment request from the connection parameters stored in the memory of the base station; and
   a transmitter for transmitting a connection establishment setup message to the user equipment.

9. A non-transitory computer readable medium having stored thereon instructions for performing a method of establishing a connection between user equipment and a base station of a radio network, wherein connection parameters used to establish a first connection between the user equipment and the base station are stored in a memory of the user equipment and in a memory of the base station prior to the release of the first connection when the instructions are executed by a processor; wherein the method comprises:
   comparing the stored connection parameters with connection parameters to be used to establish a second connection between the user equipment and the base station;
   generating a connection establishment request comprising the connection parameters to be used for establishing the second connection that differ from the stored connection parameters; and
   transmitting the connection establishment request to the base station.

10. A non-transitory computer readable medium having stored thereon instructions for performing a method of communicating between a base station and user equipment of a radio network, wherein connection parameters used to establish a first connection between the user equipment and the base station are stored in a memory of the user equipment and in a memory of the base station prior to the release of the first connection when the instructions are executed by a processor, wherein the method comprises:
- upon reception of a connection establishment request for establishing a second connection between the user equipment and the base station, comparing the stored connection parameters with connection parameters to be used to establish a second connection comprised in the connection establishment request;
- restoring the connection parameters missing from the connection establishment request from the connection parameters stored in the memory of the base station; and
- transmitting a connection establishment setup message to the user equipment.

* * * * *